US006608394B2

(12) United States Patent
Osada et al.

(10) Patent No.: US 6,608,394 B2
(45) Date of Patent: Aug. 19, 2003

(54) STARTING SYSTEM FOR VEHICLE

(75) Inventors: Masahiko Osada, Okazaki (JP); Masato Hanai, Atsumi-gun (JP); Masanori Ohmi, Anjo (JP); Mikio Saito, Motosu-gun (JP); Shuuichi Nagata, Toyota (JP); Takeshi Tachibana, Chiryu (JP); Ken Kuretake, Mishima (JP); Hideto Hanada, Yokohama (JP)

(73) Assignee: Denso Corporation, Kariya (JP)

( * ) Notice: Subject to any disclaimer, the term of this patent is extended or adjusted under 35 U.S.C. 154(b) by 96 days.

(21) Appl. No.: 09/990,295

(22) Filed: Nov. 23, 2001

(65) Prior Publication Data

US 2002/0070555 A1 Jun. 13, 2002

(30) Foreign Application Priority Data

Nov. 29, 2000 (JP) .................................... 2000-362601

(51) Int. Cl.[7] ............................................ H02P 7/00
(52) U.S. Cl. ...................................... 290/31; 322/11
(58) Field of Search ......................... 290/31, 34, 36 R, 290/38 R; 322/10, 11, 13

(56) References Cited

U.S. PATENT DOCUMENTS 5,323,102 A * 6/1994 Torii et al. .................... 322/90
5,532,573 A * 7/1996 Brown et al. ................. 322/22
5,593,367 A 1/1997 Eavenson, Sr. et al. ..... 477/203
5,606,244 A * 2/1997 Migdal .......................... 322/7
6,166,525 A * 12/2000 Crook ......................... 322/11

FOREIGN PATENT DOCUMENTS

| | | | |
|---|---|---|---|
| DE | 32 27 634 | A1 | 2/1983 |
| EP | 0 744 761 | A2 | 11/1996 |
| GB | 2 066 366 | A | 7/1981 |
| JP | A 6-101607 | | 4/1994 |

* cited by examiner

*Primary Examiner*—Nicholas Ponomarenko
(74) *Attorney, Agent, or Firm*—Oliff & Berridge, PLC

(57) ABSTRACT

In the case of an engine automatic stop and start system in which an engine is stopped while a vehicle is stopped and the engine is started when the vehicle is started, it is necessary to shorten an engine starting time when a driver desires to move the vehicle. Further, it is desirable to efficiently compensate the electric power consumed by the starter. The vehicle contains an existing low voltage power source and a high voltage power source with an excellent charging efficiency. When the engine switches from a running condition to a stopped condition while the vehicle is stopped, a change-over switch switches and applies the voltage of the high voltage power source to a starter motor. This causes the starter motor to rotate at high speeds, thereby starting the engine very quickly. Therefore, it is possible to reduce overall energy losses and improve vehicle fuel consumption.

12 Claims, 3 Drawing Sheets

STARTING SYSTEM FOR VEHICLE

CROSS REFERENCE TO RELATED APPLICATION

This application is based on and incorporates herein by reference Japanese Patent Application No. 2000-362601 filed on Nov. 29, 2000.

BACKGROUND OF THE INVENTION

1. Field of the Invention

The present invention relates to an engine starting system for a vehicle that is operated by a high voltage power source to effectively compensate for the power consumed by a starter. Additionally, the invention provides a starting system for a vehicle equipped with an automatic stop and start system that effectively shortens a vehicle engine restarting time.

2. Description of Related Art

Generally, in a conventional vehicle, a starter is driven by a single power source. However, in recent years it has been discovered that as the electric load of a vehicle increases, a high voltage power source having an excellent energy recovery efficiency may be mounted in the vehicle in addition to the existing power source.

Electric starters on engines experience comparatively large electric power consumption amounts because they begin the rotation of the engine from a standstill. That is, engines have a high resistance to rotation or a large initial rotational inertia. The electric power consumed by the starter is compensated for by the electrical power generated by an engine driven generator.

Here, a charging efficiency is higher in the case where a high voltage power source is charged to a predetermined high voltage than in the case where the existing power source (low voltage power source) is charged to a predetermined low voltage. For this reason, when the starter consumes electric power from the high voltage power source having high charging efficiency, the consumed electric power can be compensated for more effectively.

Additionally, in order to improve the fuel consumption of the vehicle and to reduce exhaust gases, an automatic engine stop (idling stop) and start system, in which the engine is stopped while the automobile is stopped, has been instituted in recent years. This automatic engine stop and start system comprises monitoring the following: a vehicle speed, an accelerator opening amount, the state of a brake, and the like. Additionally, when the vehicle stops, the engine stops, and when the brake is released, the starter begins to start the engine, thereby starting the vehicle.

In the engine automatic stop and start system, an engine starting time range is required for starting the vehicle. For instance, in the situation when the vehicle waits at a traffic signal, the National Police Agency presented a report that if the time between waiting at a signal and starting the vehicle was long, it was predicted that traffic congestion would occur in urban areas where there is a large number of vehicles. Therefore, if the engine's automatic stop and start system takes a long starting time to start the vehicle when the vehicle is waiting at a signal, the engine automatic stop and start system itself may be regulated by law. Therefore, it is urgently necessary to shorten an engine's starting time.

SUMMARY OF THE INVENTION

The present invention has been made in view of the above circumstances. The first object of the present invention is to provide a starting system for a vehicle that is operated by a high voltage power source to effectively compensate for the power consumed by the starter. The second object of the present invention is to provide a starting system for a vehicle equipped with an engine automatic stop and start system, that will shorten a vehicle engine starting time. Therefore, when the starter motor can be operated by a high voltage power source, the starter motor will be operated by the high voltage power source, and when the starter motor cannot be operated by the high voltage power source, it will be operated by a low voltage power source. In this manner, the frequency of operation of the starter motor by the high voltage power source having a higher charging efficiency is increased and hence electrical power consumed by the starter can be efficiently compensated.

When a vehicle is started by an engine automatic stop and start system, the starter motor is operated by the high voltage power source. At this time, the engine is already warmed up and can be driven at high speeds by the starter motor to which high voltage is applied. Since the engine is driven at high rotational speeds, the engine can be started in a short time. As a result, it is possible to shorten the time required for starting the vehicle when the vehicle is waiting at a traffic signal, thereby preventing vehicle occupant stress normally caused by a slow starting engine, and preventing traffic congestion caused by the engine automatic stop and start system.

The control section of the engine automatic stop and start system may be mounted on an engine control unit which is provided separately from the starting control unit. The engine control unit may send a control signal to automatically stop and start the engine according to the current state of the vehicle governed by vehicle speed, braking force, and an accelerator position. When the starting control unit receives an automatic start signal from the engine control unit, it may switch the power source switching unit to the high voltage power source and pass an electric current through the starter motor. When a manually operated key switch is set at a starter position to start the engine, the power source switching unit may be switched to the low voltage power source.

A starting system for a vehicle may further include a magnet switch for connecting or disconnecting a current passing circuit of the starter motor wherein a current passing circuit of a coil of the magnet switch includes a unit for suppressing the amount of current passing through the coil. By providing the unit for suppressing the amount of current passing through the coil, the magnet switch slowly engages a contact. As a result, the magnet switch is prevented from bouncing against the contact and prevents an arc from being generated at the contact when high voltage is applied. Therefore, it is possible to prevent the contact of the magnet switch from being welded or broken thereby improving the reliability of the magnet switch. Further, since bouncing of the magnet switch is prevented, it is possible to prevent the occurrence of noises normally caused by bounces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference to the accompanying drawings.

[First Embodiment]

Figure 1:
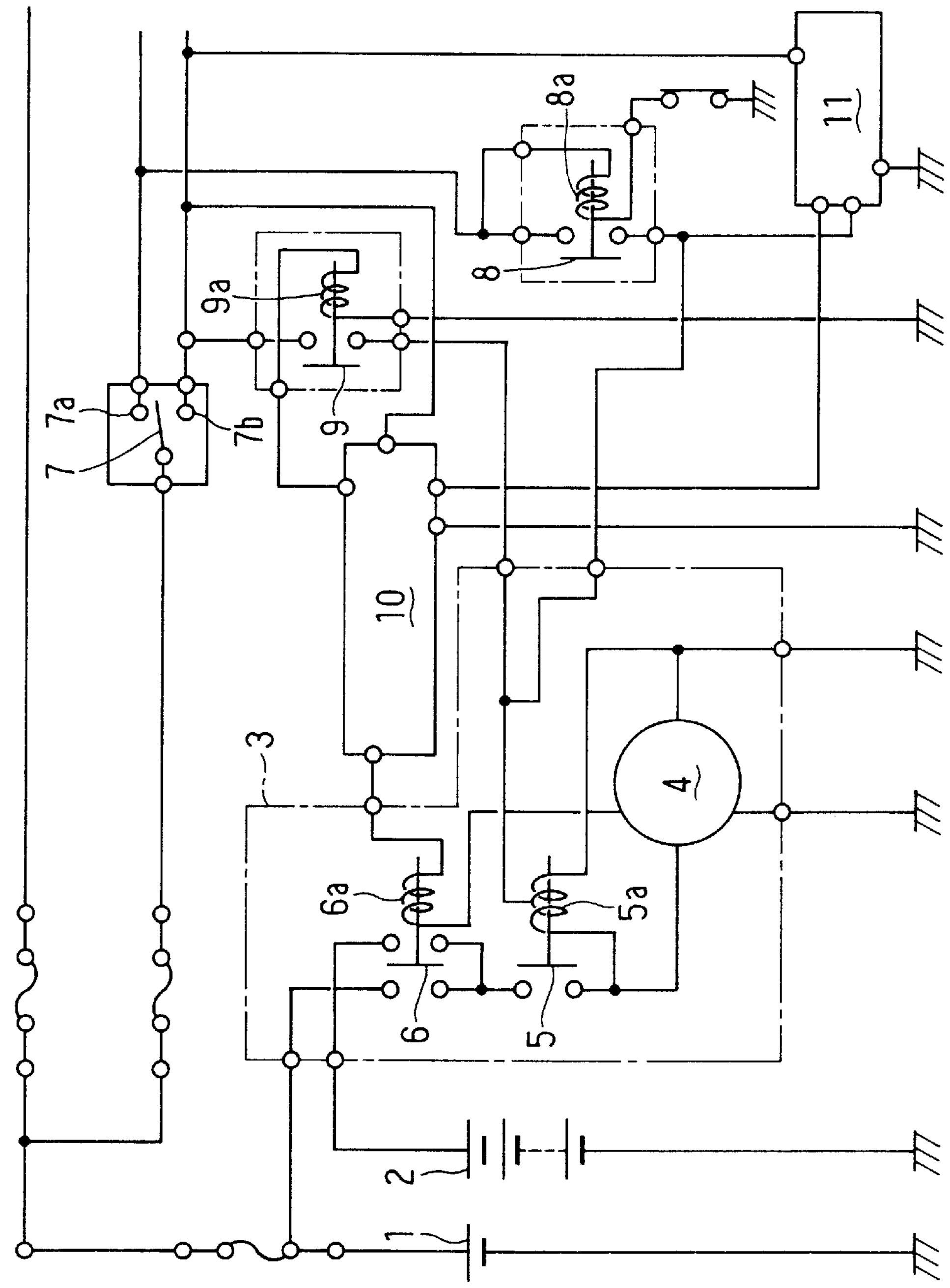
FIG. 1 is a first embodiment of a current passing circuit of a starting system for a vehicle.

FIG. 1 shows a current passing circuit of a vehicle starting system. A vehicle with this embodiment is mounted with a high voltage power source 2 (for example, a battery having a normal voltage of 36 volts (V)) having an excellent charging efficiency in addition to an existing low voltage power source 1 (for example, a battery having a normal voltage of 12 V). A starter 3 for starting an engine is provided with a starter motor 4 for rotating the engine, a magnet switch 5 for turning on or off the starter motor 4, and a change-over switch 6 (corresponding to a power source switching unit) for switching the power source to pass a current through the starter motor 4.

This first embodiment includes two current passing circuits as a circuit for passing current to the coil 5*a* (consisting of a pull-in coil and a holding coil) of the magnet switch 5. One current passing circuit is connected to the low voltage power source 1 via a key switch 7 and the first starter relay 8. When the key switch 7 is connected to a starter terminal 7*a*, the coil 8*a* of the first starter relay 8 is energized and turns on the first starter relay 8, which is a normally open movable contact, to energize the coil 5*a* of the magnet switch 5, whereby the magnet switch 5, which is a normally open movable contact, is turned on.

Another current passing circuit is connected to the low voltage power source 1 via the key switch 7 and the second starter relay 9. When the coil 9*a* of the second starter relay 9 is energized by a starting control unit 10 (hereinafter referred to as a starting ECU to be described below) in the state where the key switch 7 is connected to an ON terminal 7*b*, the second starter relay 9 of a normally movable contact is turned on to energize the coil 5*a* of the magnet switch 5, whereby the magnet switch 5, a normally open movable contact, is turned on. The change-over switch 6 switches the power source for passing the current through the starter motor 4 to the low voltage power source 1 or the high voltage power source 2 while the passage of current through the coil 6*a* of the change-over switch 6 is controlled by the starting ECU 10.

In this connection, when the coil 6*a* of the change-over switch 6 is turned off, the change-over switch 6 is connected to the low voltage power source 1 (see the state in FIG. 1), and when the coil 6*a* of the change-over switch 6 is turned on, the change-over switch 6 is connected to the high voltage power source 2. The starting ECU 10 controls the second starter relay 9 and the change-over switch 6 and is operated when the engine is started from the state where the vehicle is stopped and waiting at a signal, for instance.

To be more specific, when the starting ECU 10 receives "an automatic starting signal" (an on-signal to a predetermined port) from an engine control unit 11 (hereinafter referred to as an ECU for the engine), it switches the change-over switch 6 to the high voltage power source 2 side while it receives the automatic starting signal and turns on the second starter relay 9 and passes current through the starter motor 4.

The ECU 11 for the engine has a control section of the engine automatic stop and start system for automatically stopping the engine when the accelerator is released and the brake pedal is pressed to stop the vehicle and for starting the engine before the brake is completely released. The ECU 11 for the engine is provided to output the above-mentioned automatic starting signal to the starting ECU 10 in order to start the engine from the state where the vehicle is stopped by the engine automatic stop and start system.

Figure 2:
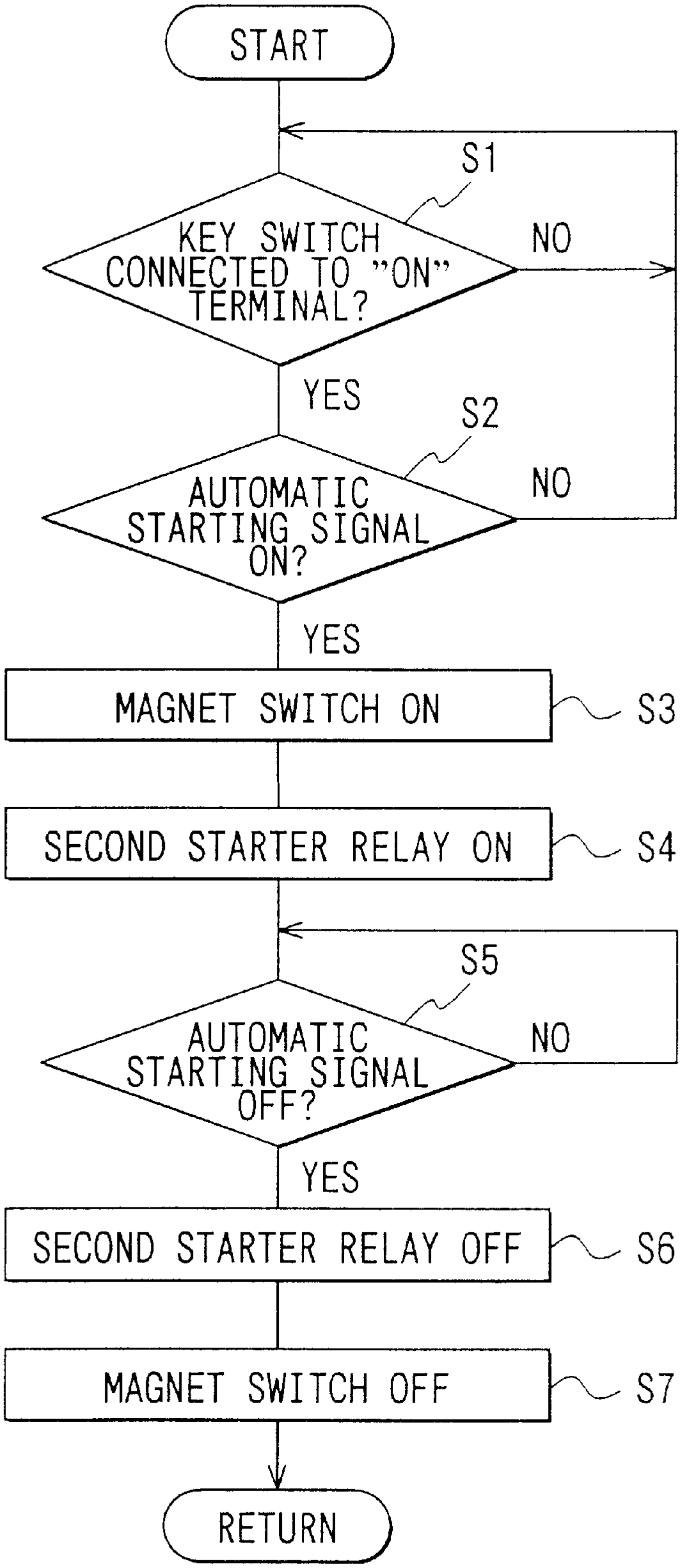
FIG. 2 is a flow chart showing the operation of the starting control unit.

Next, control by the starting ECU 10 will be described based on the flow chart shown in FIG. 2. First, the starting ECU 10 determines whether or not the key switch 7 is connected to the ON terminal 7*b* (step S1). When the result of this determination is NO, the procedure returns to repeat the determination (step S1), and when the result of this determination is YES, the starting ECU 10 determines whether or not the automatic starting signal is received from the ECU 11 of the engine (step S2). When the result of this determination is NO, the procedure is returned to step S1.

When the determination result of the step S2 is YES, that is, when the ECU 11 for the engine sends the automatic starting signal, the starting ECU 10 starts the starter 3 by the high voltage power source 2. In other words, the starting ECU 10 passes current through the coil 6*a* of the change-over switch 6 to switch from the low voltage power source 1 to the high voltage power source 2 (step S3) to pass current through the coil 9*a* of the second starter relay 9 (step S4). Then, the magnet switch 5 is turned on to connect the high voltage power source 2 to the starter motor 4, whereby high voltage is applied to the starter motor 4.

Next, the starting ECU 10 determines whether the automatic starting signal sent from the ECU 11 of the engine is turned off or not (step S5). In other words, the starting ECU 10 determines whether or not the engine is started by the start of the starter motor 4 and the number of revolutions N of the engine is made larger than a predetermined number of revolutions N0 (N>N0) and the ECU 11 of the engine stops sending the automatic starting signal. When the result of this determination is NO, the engine has not finished starting, so the procedure returns to step S5.

When the determination result of step S5 is YES, that is, when the engine is started, the starting ECU 10 stops the operation of the starter 3. In other words, the starting ECU 10 stops passing current through the coil 9*a* of the second starter relay 9 (step S6) and stops passing current through the coil 6*a* of the second starter relay 6 to switch from the high voltage power source 2 to the low voltage power source 1 (step S7). Then, the magnet switch 5 is turned off to stop passing current through the starter motor 4, whereby the operation of the starter 3 is stopped.

The following is an explanation of the invention in greater detail. When a vehicle occupant starts the engine, the key switch 7 is connected to the starter terminal 7*a*. Then, the first starter relay 8 is turned on and engages the magnet switch 5. At this time, the starting ECU 10 does not pass current through the coil 6*a* of the change-over switch 6 and the change-over switch 6 is set to the low voltage power source 1 and the low voltage is applied to the starter motor 4. When the engine is started, the key switch 7 switches from the starter terminal 7*a* to the ON terminal 7*b*. Then, the first starter relay 8 is turned off which turns off the magnet switch 5, causing the passage of current through the starter motor 4 to stop.

When the vehicle is stopped and waiting for a traffic signal or the like, the engine is stopped by the engine automatic stop and start system mounted on the ECU 11 of the engine. When the vehicle starts from a stopped state, the ECU 11 of the engine outputs the automatic starting signal to the starting ECU 10 in order to start the engine with the starter 3. Then, the change-over switch 6 switches to the high voltage power source 2 by the action of the starting ECU 10 which turns on the second starter relay 9 which turns on the magnet switch 5. Then, high voltage of the high voltage power source 2 is applied to the starter motor 4.

When the engine is started and the number of revolutions increases over a predetermined number of revolutions, the ECU 11 of the engine stops the output of the automatic starting signal. Then, the starting ECU 10 switches the change-over switch 6 to the low voltage power source 1 and turns off the second starter relay 9 to turn off the magnet switch 5, thereby stopping the passage of current through the starter motor 4.

The effect of that described above will now be detailed. When the vehicle is started by the engine automatic start and stop system, the starter motor 4 is operated by the high voltage power source 2. When the vehicle is started in this manner, the engine is already warmed up and hence when the high voltage is applied to the starter motor 4, the engine will rotate at high speeds. Since the engine is rotated at high speeds in this manner, the engine starts quickly. As a result, it is possible to shorten the starting time of the vehicle when at a signal thus preventing the stress applied to a vehicle occupant (usually caused by a long start time) and also preventing any traffic congestion from being caused by the engine automatic start and stop system.

Further, when the vehicle is started by the engine automatic start and stop system, the starter motor 4 is operated by the high voltage power source 2 which has an excellent charging efficiency and hence the power consumed by the operation of the starter 3 when a car is started from a stop can be effectively compensated. In other words, when the starter 3 is operated only by the low voltage power source 1, the consumed power needs to be compensated for because the low voltage power source 1 has a low charging efficiency and hence the energy loss is made very large by an increase in the rate of operation of the starter by the engine automatic start and stop system. However, in the engine automatic start and stop system of the present invention, the starter motor 4 is operated by the electric power of the high voltage power source 2 having a high charging efficiency and hence the consumed electric power is effectively compensated for by the generator. As a result, it is possible to greatly reduce the energy loss and improve fuel consumption.

[Second Embodiment]

Figure 3:
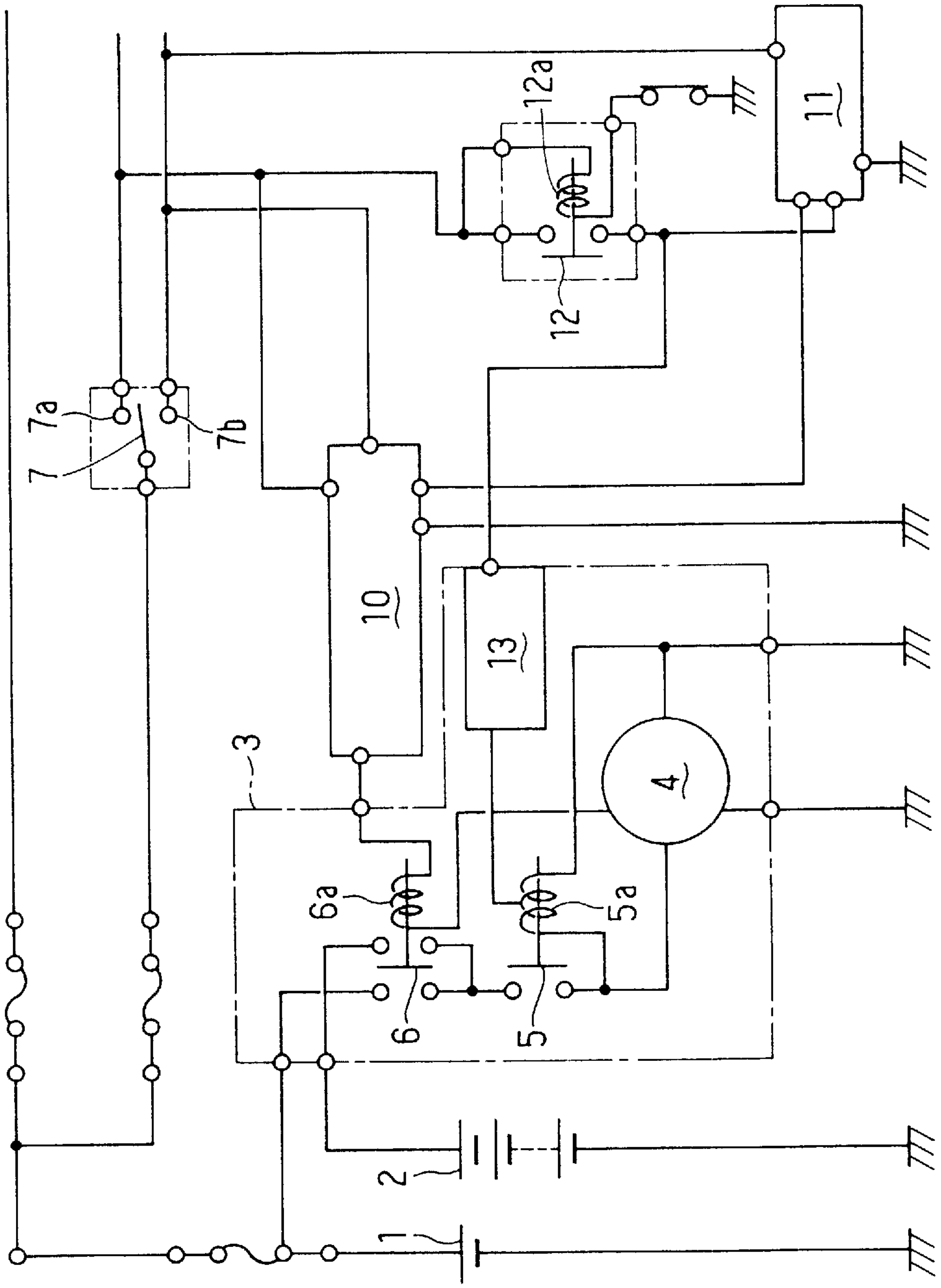
FIG. 3 is a second embodiment of a current passing circuit of a starting system for a vehicle.

FIG. 3 is a second embodiment of a current passing circuit of a vehicle starting system. Here, the reference characters of FIG. 3 that are the same as those of the first embodiment shown in FIG. 1, designate the same functional parts. Continuing with the second embodiment, the first starter relay 8 and the second starter relay 9 shown in the first embodiment of FIG. 1, are made a common starter relay 12. The coil 12*a* of the common starter relay 12 is energized by a starting ECU 10 that receives an automatic starting signal when a key switch 7 is set to a starting position and when the coil 12*a* is energized. When the coil 12*a* is energized, the starter relay 12 turns on and a magnet switch 5, also turns on.

Continuing with the second embodiment, the current passing circuit of the coil 5*a* of the magnet switch 5 has a unit 13 for suppressing the amount of current passing through the coil 5*a*. The unit 13 for suppressing the amount of current varies the duty factor of the coil 5*a* of the magnet switch 5 by a PWM control, or the like, and includes a semiconductor switching device for continuing or discontinuing the passage of current through the coil 5*a*, an oscillator for turning on or off the switching device by a predetermined pulse signal, and a variable unit for varying the on-time of the switching device.

By providing the current passing circuit of the coil 5*a* of the magnet switch 5 with the unit 13 for suppressing the amount of the current, the magnet switch 5 slowly makes contact with a contact. This may prevent the magnet switch 5 from bouncing against the contact and hence an arc from being generated at the contact to which high voltage is applied. As a result, it is possible to prevent the contact of the magnet switch 5 from becoming broken or welded thereby yielding an improvement in the reliability of the magnet switch 5. Further, since the bounce of the magnet switch 5 is prevented, it is possible to prevent the occurrence of noise generated by a bounce and subsequent contact.

[Modified Embodiment]

While the embodiment in which the change-over switch 6 is provided inside the starter 3 has been described in the above embodiments, the change-over switch 6 may be provided outside the starter 3. The circuit configuration of the starter 3 shown in the above embodiments is one example for describing the embodiment. However, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A starting system for a vehicle comprising:

a power source switching unit for switching between a low voltage power source and a high voltage power source;

a starter motor for generating a rotational torque to start an engine by the application of voltage switched by the power source switching unit; and a starting control unit for switching the power source switching unit in accordance with a state of the vehicle.

2. A starting system for a vehicle according to claim 1, wherein the starting system for a vehicle is used for the vehicle mounted with an engine automatic stop and start system which stops the engine while the vehicle is stopped and starts the engine when the vehicle is started, and wherein the power source switching unit is switched to the high voltage power source by the starting control unit when the vehicle is started by the engine automatic stop and start system.

3. A starting system for a vehicle according to claim 2, wherein a control section of the engine automatic stop and start system is mounted on an engine control unit which is provided separately from the starting control unit and sends a signal for a direction signal to automatically stop and start the engine according to a state of the vehicle corresponding to a vehicle speed, a brake, and an accelerator.

4. A starting system for a vehicle according to claim 3, wherein the starting control unit switches the power source switching unit to the high voltage power source and performs a control for passing an electric current through the starter motor when the starting control unit receives an automatic start signal from the engine control unit.

5. A starting system for a vehicle according to claim 1, wherein the power source switching unit is switched to the low voltage power source when a manually operated key switch is set at a starter position to start the engine.

6. A starting system for a vehicle according to claim 1, further comprising a magnet switch for connecting or disconnecting a current passing circuit of the starter motor, wherein a current passing circuit of a coil of the magnet switch includes a unit for suppressing the amount of current passing through the coil.

7. A starting system for a vehicle comprising:

a power source switching unit for switching between a first voltage source and a second voltage source;

a starting control unit for switching the power source switching unit in accordance with a state of the vehicle;

an engine control unit for transmitting a starting signal to the starting control unit; and a magnet switch for controlling power from either the first voltage source or the second voltage source and routing it to a starter motor.

8. The starting system for a vehicle of claim 7 further comprising, a key switch for switching between a starter terminal and an ON terminal;

a first starter relay for relaying energy from the first voltage source to the magnet switch, thereby energizing the starter motor with energy from the first voltage source when the key switch is switched to the starter terminal;

a second starter relay for relaying energy to the magnet switch, thereby energizing the starter motor with energy from the first voltage source or the second voltage source.

9. The starting system for a vehicle of claim 8, wherein a change-over switch switches the power source for passing current through the starter motor to the low voltage source or the high voltage source while the passage of current through the change-over switch is controlled by the starting control unit.

10. The starting system for a vehicle of claim 7, further comprising, a common starter relay energized by the starting control unit, the common starter relay also turning on the magnet switch.

11. The starting system for a vehicle of claim 10, further comprising, a suppression unit for suppressing an amount of current passing through a magnet coil of the magnet switch, wherein the suppression unit controls the rate of contact of the magnet switch.

12. A method of controlling a starting control unit of a vehicle engine starting system, the method including the steps of:

determining whether a key switch is connected to an ON terminal;

determining whether an automatic starting signal is received from an engine control unit of the engine when the key switch is connected to an ON position;

turning a magnet switch to an ON position when the automatic starting signal is received from the engine control unit to begin a passage of current to a starter motor;

turning a second starter relay ON when the automatic starting signal is received from the engine control unit;

determining whether an automatic starting signal is OFF after the second starter relay is turned ON;

turning a second starter relay OFF when an automatic starting signal is OFF; and turning a magnet switch to an OFF position in order to stop a passage of current through the starter motor.

* * * * *